W. H. Hall,
Horse Boot.
No. 111,740. Patented Feb. 14, 1871.

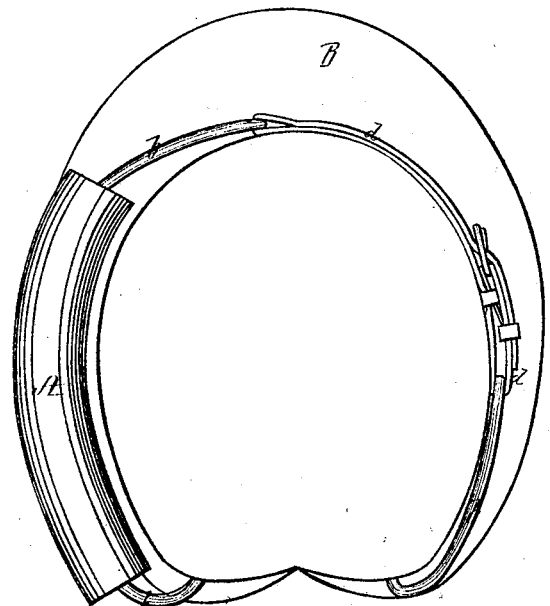
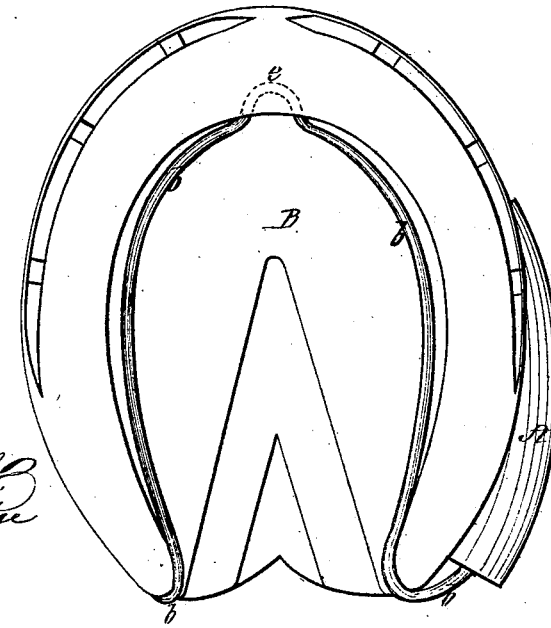

United States Patent Office.

WILLIAM H. HALL, OF BOSTON, ASSIGNOR TO HIMSELF AND JOSEPH W. HASKINS, OF CHARLESTOWN, MASSACHUSETTS.

Letters Patent No. 111,740, dated February 14, 1871.

IMPROVEMENT IN INTERFERING-PADS FOR HORSES.

The Schedule referred to in these Letters Patent and making part of the same.

*To all whom it may concern:*

Be it known that I, WILLIAM H. HALL, of Boston, in the county of Suffolk and State of Massachusetts, have invented an Improved Interfering-Pad for Horses, of which the following is a full, clear, and exact description, reference being had to the accompanying drawing making part of this specification, in which—

Figure 1 is a plan of a horse's hoof with my improved interfering-pad applied thereto.

Figure 2 is a plan of the under side of the same.

Interfering-pads for horses as heretofore made are objectionable for the reason that it is difficult to keep them from turning around or slipping up on the hoof after being placed in position.

My invention has for its object to overcome these difficulties and to produce an interfering-pad which can be readily applied to any hoof without regard to its size or shape, can be adjusted into the exact position required after having been applied to the hoof, and which after being adjusted will remain permanently in place; and My invention consists in a tube or cushion composed of rubber or other suitable elastic material, which rests against one side of the hoof, and is held in place by a wire extending longitudinally through it and around the inner edge of the shoe, and upon the opposite side of the hoof, the two ends of the wire being provided with eyes or loops, so as to admit of their being drawn tightly down upon the hoof by a strap or thong of leather or piece of cord.

To enable others skilled in the art to understand and use my invention, I will proceed to describe the manner in which I have carried it out.

In the said drawing—

A is a tube or cushion, composed of rubber or other suitable elastic material, which forms the interfering-pad, within which is placed a thick wire, *b*, which is annealed so that it will "set" and retain the tube in any form into which it may be bent to conform to the curve of the hoof B, to which it is applied, as seen in fig. 1.

This wire *b* extends around one end of the shoe, and lies upon the bottom of the hoof against the inner edge of the shoe, and then passes around the other end of the shoe and upon the side of the hoof opposite to that to which the pad is applied.

Each end of the wire *b* is provided with an eye or loop, *c*, for the reception of a strap or thong of leather, *d*, fig. 1, or piece of cord, so that, after the wire is sprung into place, its ends may be drawn firmly down upon the hoof, and the pad A thus secured immovably in place.

A projecting portion, *e*, of the wire *b* fits under the shoe, but this projection may be dispensed with, if desired.

It will be seen that after the pad A is applied to the hoof, it may be readily adjusted to the exact position required by sliding it on the wire *b*, after which it is held securely and permanently in place by tightening the strap *d*, and all liability of the pad turning around or slipping up on the hoof is thus entirely avoided.

Figure 3:
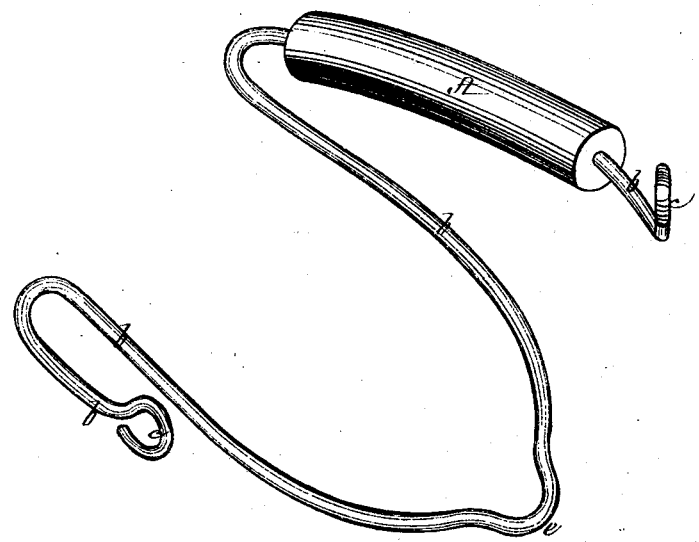
Figures 3 and 4 are views of my improved interfering-pad detached.
Figure 4:
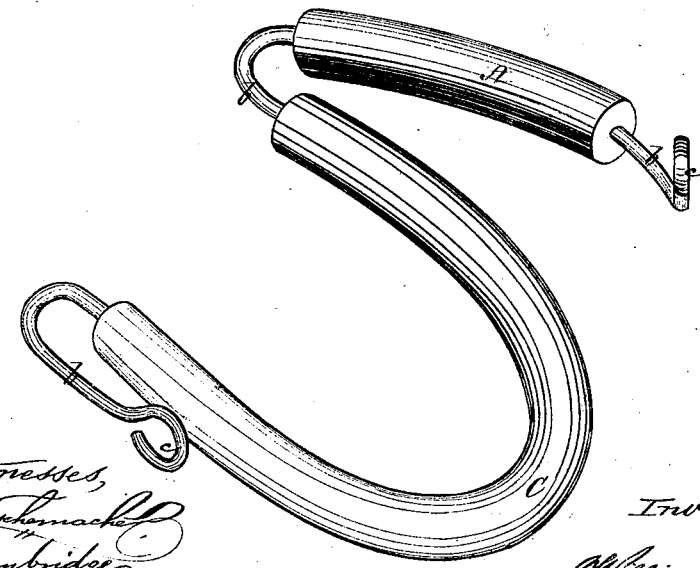

If desired, that portion of the wire *b* which extends around the inner edge of the shoe may be covered with rubber or other suitable elastic material, as seen at C, fig. 4, thus forming a "protector" for excluding dirt and snow, similar to that described in Letters Patent of the United States granted to myself and Joseph W. Haskins, on the 8th day of March, A. D. 1870.

The peculiar construction of the above-described interfering-pad enables it to be easily bent to fit any hoof without regard to its size or shape, while it can be readily adjusted into the exact position required after being applied to the hoof, and then tightened and secured permanently in place, which cannot be done with any other interfering-pad heretofore constructed with which I am acquainted.

Claim.

What I claim as my invention, and desire to secure by Letters Patent, is—

The within-described interfering-pad consisting of an elastic tube or cushion, A, secured in place by a wire, *b*, which passes through it longitudinally and extends around the inner edge of the shoe and upon the outside of the hoof, where it is fastened, substantially as set forth.

Witness my hand this 8th day of December, A. D. 1870.

WILLIAM H. HALL.

Witnesses:
P. E. TESCHEMACHER,
W. J. CAMBRIDGE.